March 13, 1945.  H. G. HILL  2,371,170
CAN SOLDERING MECHANISM
Filed Aug. 12, 1942
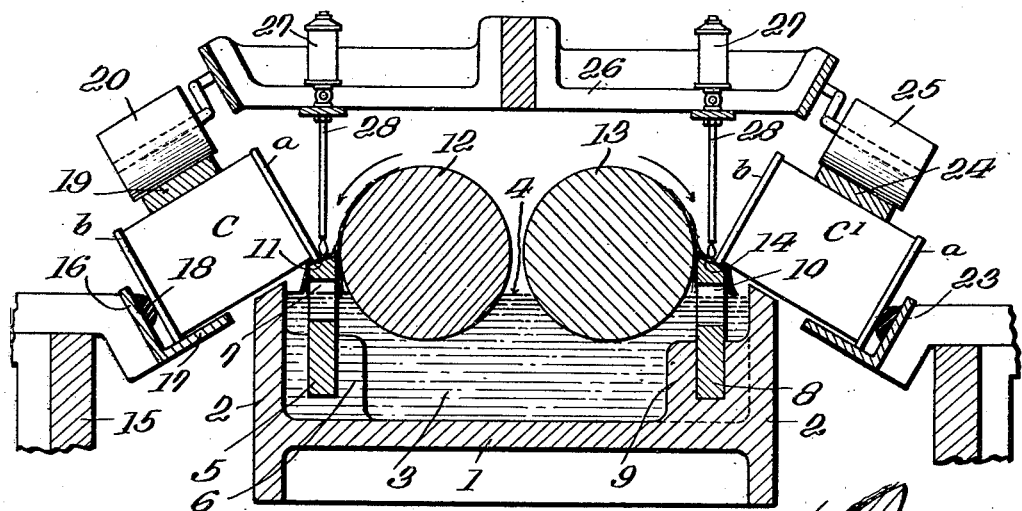
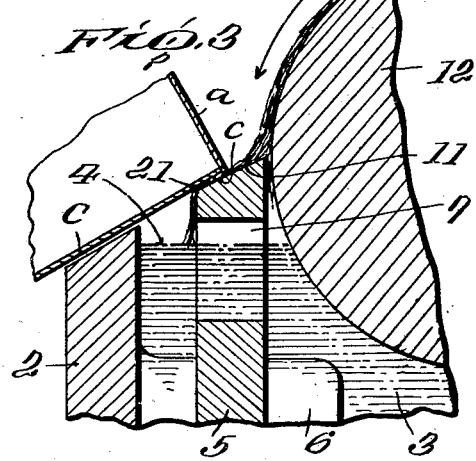
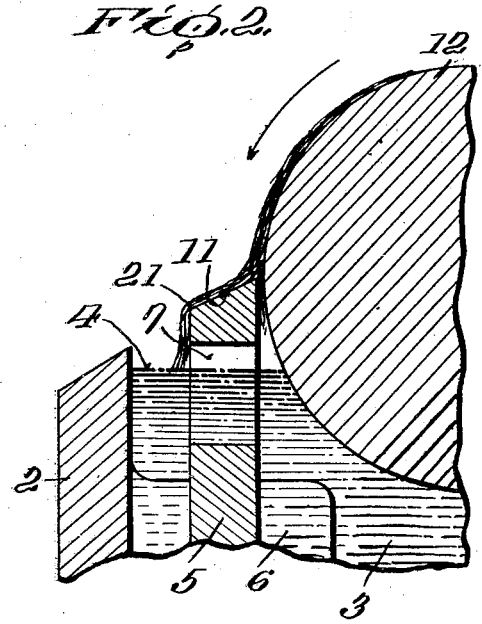
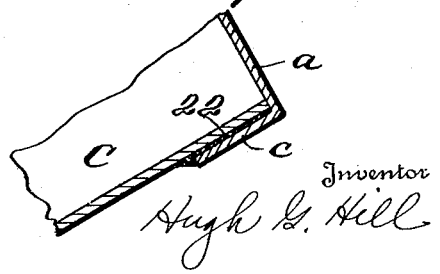
Inventor
Hugh G. Hill
By Mason, Porter & Diller
Attorneys Patented Mar. 13, 1945

2,371,170

UNITED STATES PATENT OFFICE 2,371,170

CAN SOLDERING MECHANISM

Hugh G. Hill, Wheeling, W. Va., assignor to Continental Can Company, Inc., New York, N. Y., a corporation of New York Application August 12, 1942, Serial No. 454,589

3 Claims. (Cl. 113—68)

The invention relates to new and useful improvements in a soldering mechanism for soldering the ends to the bodies of sheet metal cans and more particularly to a soldering mechanism for soldering cans having snap-on ends.

An object of the invention is to provide a soldering mechanism wherein the upper end of a can body rolling on an inclined axis may be subjected to a thin flowing film of molten solder so disposed relative to the rotating can body that the flange of the can head and the body wall adjacent said head only contact with the solder film.

A further object of the invention is to provide a soldering mechanism of the above type wherein a rotating roll lifts solder from a bath and feeds the same onto a solder applying means so as to provide a thin flowing film of solder over said applying means, and wherein the speed of the feeding roll determines the amount of solder flowing over the applying means.

A still further object of the invention is to provide solder applying means of the above type wherein the solder feeding rolls and the applying means associated therewith are so disposed relative to the supply bath of solder as to protect said bath to a large extent from exposure to the oxygen of the air.

These and other objects will in part be obvious and will in part be hereinafter more fully disclosed.

In the drawing which shows by way of illustration one embodiment of the invention, Figure 1 is a vertical sectional view taken transversely of the soldering mechanism, Figure 2 is an enlarged vertical section of a portion of the soldering mechanism showing the solder flowing over the solder applying rail without the presence of a can to be soldered, Figure 3 is a view similar to Figure 2 but showing the can rolling along the supporting rail and the application of solder for securing the head to the can body, and Figure 4 is an enlarged sectional view through a portion of the can body soldered on my improved mechanism.

The invention has to do with a soldering mechanism for soldering can heads to the bodies of sheet metal cans. The cans being soldered are of the type wherein the head or closure ends for the body are flanged and make a tight outside slip or snap-on connection with the body wall. One of the heads is provided with a filling opening which is closed after the container is filled by a suitable means. The soldering mechanism is of the type wherein the can bodies are rolled along the solder applying means and thus the ends are joined to the can bodies. This solder applying mechanism includes supporting rails which are so disposed that the can, as it travels along the rails rotates about an inclined axis. The rail at the upper end of the can body has its upper face inclined at a slightly lesser degree than the axis on which the can body is rotated and the guiding rail at the other end of the can body is so positioned that the can body rests on the lower edge of the inclined face of the upper guide rail with the flange of the head slightly spaced from said surface. This upper guide rail is disposed lengthwise of a bath of molten solder.

Also located in the bath is a feed roll which is partly immersed in the solder bath and thus lifts solder from the bath and feeds it onto the upper inclined edge of the solder applying rail. The solder flows in a thin film over the upper surface of the rail and thus it is that solder is brought into contact with the flange of the head and the body wall adjacent the flange without any appreciable amount of solder contacting with the outer face of the can head. The solder mechanism is preferably constructed so that the cans may be rolled along one side thereof for soldering one head and then returned along the other head for soldering the other head. The solder feed rolls and the rails which apply solder to the heads are all so disposed relative to the solder bath that the solder bath is substantially protected from contact with the oxygen of the air.

Referring more in detail to the drawing, the solder mechanism includes a solder tank 1 which may be of any desired construction. It is provided with parallel side walls 2—2. In the tank is a solder bath indicated at 3 which is kept in molten condition by any suitable heating means. The level of the solder bath is indicated at 4.

Mounted along the left-hand side of the tank 1 as viewed in Figure 1, is a can supporting rail 5. This can supporting rail is mounted in lugs 6 which are formed as part of the tank, and thus the rail is rigidly supported. The rail is so disposed that it projects not only above the level of the bath, but also above the side walls of the tank. There are a series of holes 7 through this rail in the region of the level of the bath. These holes are substantially one inch in diameter with the centers two inches apart. There is a similar guide rail 8 on the other side of the tank as shown in Figure 1 and this guide rail is mounted in supporting lugs 9 and also has openings 10 therethrough similar to the openings in the rail 5.

The upper edge 11 of the guiding rail 5 is inclined from the inner side thereof downwardly to the outer side thereof. This inclined face is the solder applying face. Mounted for rotation above the tank 1 is a solder feed roll 12. This solder feed roll 12 rotates about an axis parallel with the guide rail 5 and the side wall 2 of the tank. The feed roll is so disposed that its lower edge portion is immersed in the solder bath, that is, it projects below the level 4 of the solder bath. Said roll rotates in a counterclockwise direction, as indicated by the arrow, and is so disposed relative to the upper inclined edge of the solder applying surface 11 that solder is scraped from the feed roll and flows in a thin film over the inclined surface, as shown in Figure 2 of the drawing where the solder film is indicated at 13. The solder flowing over the surface, if not taken up by the can body, will pass into the portion 3a of the solder bath which is connected through the holes 7 with the main solder bath. By varying the speed of rotation of this feed roll 12 the amount of solder flowing over the solder applying surface 11 can be varied. In other words, the thickness of the film of solder can be increased or decreased through the changing of the speed of rotation of this feed roll 12.

On the opposite side of the tank is a feed roll 13 which rotates in a clockwise direction and feeds solder onto the inclined solder applying surface 14 of the rail 8. The two feed rolls 12 and 13 are only about ¼ inch apart so that the surface of the bath between the feed rolls is well protected from exposure to the oxygen of the air. The portion of the solder bath outside of the rails 5 and 8 is relatively narrow so that a very limited portion of the surface of the solder bath is exposed to the oxygen of the air in this region.

Extending along the side wall of the tank is a supporting member or frame structure 15 upon which is mounted a guide rail 16. Said guide rail is in the form of an angle bar and the can body rests on and rolls along the portion 17 thereof.

Attached to the other portion of this guide rail is a semi-circular bar 18. One of the can bodies which is being soldered is indicated at C. This can body has heads a and b attached thereto. The head a is provided with a flange c. This flange of the head is so dimensioned that it makes a very tight slip-on connection with the wall of the can body and the head is often referred to as a snap-on head.

The can bodies are rolled along the supporting rails 5 and 16 by an endless belt 19. Tension rolls 20 are associated with this belt for holding the belt in contact with the can bodies so that they will be rotated at a uniform speed as they are fed along the guide rails. These guide rails are so disposed relative to each other that the axis of rotation of the can C is at a slightly greater angle than the angle of inclination of the solder applying surface 11 of the rail 13. The rails are also so disposed relative to each other that the point of contact between the upper end of the can and the solder applying surface 11 is at the lower corner 21 of the rail. The contact with the can body is a slight distance below the lower end of the flange c of the can head. The can head flange is therefore either lightly in contact with the inclined surface 11 or slightly spaced therefrom. In fact, the can body and the can flange are supported by the film of solder flowing over the inclined surface 11 and the solder is caused to sweat in between the flange c and the body wall as indicated at 22 in Figure 4. It will be noted that the solder sweating in between the flange and the can body will terminate at the upper end of the body wall and does not flow through to the interior of the can. It will also be noted that the outer face of the can head a does not contact with the solder and therefore the smearing of the face of the can head with solder which usually occurs in the present type of soldering mechanism is avoided. The can bodies after they leave the rails 5 and 16, are conveyed through suitable mechanism onto the guide rails 8 and 23 at the other side of the solder tank and the cans which are indicated at C' now present the other head b to the solder applying mechanism for the soldering of the same to the can body. The rail 23 is similar in construction to the rail 16 and it is similarly disposed relative to the rail 8 so that the soldering of the head to the can body is accomplished in the manner described above. The cans are conveyed along these rails 8 and 23 by a belt 24 with which is associated a tension roll 25. The tension rolls 20 and 25 are mounted on a suitable frame structure 26 located above the tank. Flux is fed to the solder applying surface of the rails from fluxing cups 27 with which are associated flux distributing wicks 28—28.

To further protect the solder bath from contact with the oxygen of the air, any well known solder salt may be applied to the surface of the bath in the region between the feed rolls and the side walls of the tank.

The operation of the soldering mechanism is thought to be clear from the detailed description given above. The can bodies are rolled along one side of the solder tank where one end is soldered to the can body and are then caused to travel along the other side of the tank where the other end is soldered to the can body. The cans as they move along are so disposed that the upper ends are soldered and this is accomplished by subjecting the flange and body wall adjacent the flange only to a flowing film of solder which passes over the inclined faces of the upper guide rails on which the can bodies travel. The solder is supplied to these rails by feed rolls and the amount of solder flowing over each solder applying surface is determined by the speed of the feed rolls. The solder supplying rails and the feed rolls are so dimensioned and positioned relative to the solder bath that the surface of the solder bath is protected from contact with the oxygen of the air. As only a small section of the can passes over the solder bath the can does not pass through fumes which arise from the bath which have a tendency to discolor the body of the can.

It is obvious that many changes in the details of construction and arrangement of parts may be made without departing from the spirit of the invention as set forth in the appended claims.

What is claimed is:

1. A soldering mechanism for cans, including in combination a tank for a bath of molten solder, a can supporting rail located in the tank adjacent each side wall thereof, said supporting rails projecting above the tank and having their respective upper faces inclined downwardly relative to the surfaces of the bath from the inside of the rail to the outside thereof, a solder feeding roll located in the tank at the inside of each rail and disposed so as to discharge solder taken from the bath onto the said rails, whereby the solder flows over each rail in a film from the inner to the outer side thereof, means for supporting and rolling the cans along each side of the tank in an inclined position with the upper ends of the cans in contact with the outer edges of the rails and the solder film flowing over the rails, said rails having openings therethrough to permit the solder in the bath to circulate from the outer sides of the rails to the inner sides thereof, said cans, the supporting rails and the solder feeding rolls being disposed so as to substantially cover the surface of the molten bath so as to prevent excessive contact of air therewith.

2. A soldering mechanism for cans including in combination a tank containing a bath of molten solder, a can supporting rail located in the tank adjacent the side wall thereof, said supporting rail projecting above the surface of the bath and having its upper face inclined downwardly relative to the surface of the bath from the inside of the rail to the outside thereof, a solder feeding roll located in said bath and disposed so that solder is scraped from the roll onto the inclined face of the rail at the inside thereof whereby the solder will flow in a film over said inclined face, means for supporting cans whereby they may be rolled along said rail with their axes at a slightly greater angle than the angle of inclination of the inclined face of the rail and with the upper end of the can body in contact with said rail at the outer edge thereof and the end of the can body in contact with the solder film flowing over said rail, and means for rolling said cans along said supporting rail.

3. A soldering mechanism for cans including in combination a tank containing a bath of molten solder, a can supporting rail located in the tank adjacent the side wall thereof, said supporting rail projecting above the surface of the bath and having its upper face inclined downwardly relative to the surface of the bath from the inside of the rail to the outside thereof, a solder feeding roll located in said bath and disposed so that solder is scraped from the roll onto the inclined face of the rail at the inside thereof whereby the solder will flow in a film over said inclined face, a second can supporting rail disposed outside of said tank and parallel with said first-named supporting rail, said rails being disposed so that cans may be rolled along the same with their axes at a slightly greater angle than the angle of inclination of the inclined face of the rail and with the upper end of the can body in contact with the first-named rail at the outer edge thereof and the end of the can body in contact with the solder film employed over said rail, and means for rolling said cans along said supporting means.

HUGH G. HILL.